United States Patent [19]

Murphy et al.

[11] Patent Number: 4,872,081

[45] Date of Patent: Oct. 3, 1989

[54] DUPLEX ELECTRICAL RECEPTACLE WITH VOLTAGE SURGE SUPPRESSION

[75] Inventors: Patrick J. Murphy, Camillus; William L. Emeny, Jr., Canastota; David A. Finlay, Sr., Marietta, all of N.Y.

[73] Assignee: Pass & Seymour, Inc., Syracuse, N.Y.

[21] Appl. No.: 255,455

[22] Filed: Oct. 11, 1988

[51] Int. Cl.[4] .............................................. H02H 1/04

[52] U.S. Cl. .................................. 361/117; 361/118; 361/127; 361/357; 361/395; 361/399

[58] Field of Search ..................... 361/56, 86, 91, 111, 361/117, 118, 126, 127, 334, 356, 357, 392, 395, 399; 174/51, 52 R, 52 PE, 53, 54

[56] References Cited

U.S. PATENT DOCUMENTS

| | | | |
|---|---|---|---|
| 4,013,929 | 3/1977 | Dietz et al. | 361/357 |
| 4,259,705 | 3/1981 | Stifter | 361/118 X |
| 4,500,862 | 2/1985 | Shedd | 361/118 X |
| 4,688,135 | 8/1987 | Leopold | 361/56 X |
| 4,703,386 | 10/1987 | Speet et al. | 361/111 X |
| 4,739,450 | 4/1988 | Misencik | 361/395 X |
| 4,788,621 | 11/1988 | Russell et al. | 361/357 X |
| 4,794,485 | 12/1988 | Bennett | 361/127 |

*Primary Examiner*—Derek S. Jennings
*Attorney, Agent, or Firm*—Charles S. McGuire

[57] ABSTRACT

An electrical receptacle having front and rear casings forming an enclosed housing for a printed circuit board carrying contacts into which the blades of a plug connected to the receptacle are inserted. The housing includes portions cooperatively placed with respect to the circuit board to provide underlying support for the contacts, as well as to assist in positioning the circuit board relative to the housing. The circuit components carried by the circuit board include three varistor devices for suppressing high transient voltages and the housing includes internal walls providing spaced cavities to receive the respective varistor devices. Another aspect concerns a one-piece mounting strap positioned entirely exteriorly of the receptacle housing and connected thereto by cooperative engagement portions on the strap and the housing, requiring no screws, rivets or other fastening devices.

24 Claims, 8 Drawing Sheets

DUPLEX ELECTRICAL RECEPTACLE WITH VOLTAGE SURGE SUPPRESSION

BACKGROUND OF THE INVENTION

The present invention relates to electrical receptacles incorporating circuit elements for protecting components of electrical apparatus connected to such receptacles against damage due to high, transient voltages in the electrical circuit wherein the receptacle is incorporated. More specifically, the invention relates to wall mount electrical receptacles having unique structural features particularly directed to efficient incorporation of integral means for clamping high, transient voltages to a lower, safe level.

Electrical receptacles having integral surge suppressors operative for protecting electrical apparatus connected to the outlets from transient line voltage surges have been provided both in so-called power strips which themselves are plugged into a standard wall receptacle, and in otherwise conventional receptacles flush-mounted with a room wall in a standard junction box. An example of the former is found in U.S. Pat. No. 4,259,705 which discloses a housing having several sets of plug-receiving openings for connection thereto of one or more electrical appliances or other apparatus, as well as a cord terminating in a plug for for connection to an AC power source through a standard receptacle. The housing contains circuit means connected to the line, neutral and ground contacts of each set of receptacle openings to provide protection against voltage surges across the line and neutral, line and ground, and neutral and ground lines. Another form of surge-protection device having a single set of plug-receiving openings and corresponding set of blades for insertion in a standard receptacle, and further including a light-emitting diode for indicating the operative condition of the protective circuitry, is shown in U.S. Pat. No. 4,089,032.

The wall mounted receptacle of U.S. Pat. No. 4,217,619 is modified from a duplex receptacle to provide a single set of plug-receiving openings and contacts with a single surge protection device (varistor) positioned in the space normally occupied by the second set of contacts. More recent U.S. Pat. No. 4,688,135 discloses a duplex, wall mounted receptacle having surge-suppressing components mounted in a module connected to the receptacle by separate plug-in means.

Due to the proliferation of electrical or electronic devices requiring protection from high transient voltages on AC power lines, it is desireable to have available wiring devices such as flush-mounted wall receptacles with built-in surge suppression means. It is further desireable that such receptacles be of the same size as previous, standard receptacles having no surge suppression capability, and include means for mounting in conventional trade or junction boxes. As a still further desireable feature, such receptacles should be available in so-called "hospital grade" form, this designation being applied by testing organizations to wiring devices of exceptionally rugged and high quality design.

The present invention is directed to, and includes among its objects, the provision of electrical receptacles having some or all of the foregoing features. That is, the invention contemplates provision of a hospital-grade, flush-mounted wall receptacle of standard size and external configuration including compact and efficiently mounted components for protecting electrical devices connected to the receptacle against damage due to voltage surges or spikes on the AC circuit to which the receptacle is connected. In another aspect, the invention is concerned with novel and improved mounting means, including a mounting strap positioned entirely exteriorly of the housing, for a hospital-grade, flush-mounted wall receptacle. The mounting means includes cooperative portions on the mounting strap and housing which maintain the receptacle in assembled relation without the usual screws, rivets or other such fastening means.

SUMMARY OF THE INVENTION

The electrical receptacle includes front and rear casing members configured for mating engagement to provide an enclosed housing. The disclosed and preferred embodiment is that of a duplex receptacle having two sets of openings in the front wall for receiving the blades or prongs of male plugs connected to the receptacle. The usual female receptacle contacts are positioned within the housing in registration with the blade-receiving openings, and are connected to terminal and ground busses, each having portions accessible on the exterior of the housing for connection thereto of incoming electrical leads and grounding means.

Voltage surge protection is provided in all three modes, i.e., line-heutral, line-ground and neutral-ground, by a circuit including three varistors and the terminal and ground busses, as well as a light-emitting diode which provides a visual indication of the operative condition of the surge suppression means. The circuit components are mounted upon a printed circuit board providing the necessary electrical connections of the components. The p.c. board has an external configuration designed to fit within a recess in the rear casing and, in the fully assembled condition of the receptacle, the board is fully encased in an epoxy potting material.

One of the unique features of the receptacle resides in the cooperative design and positioning of portion of the front and rear casings in relation to the p.c. board and female contacts. A plurality of rigid members formed integrally with the rear casing extend from the inner surface of the back wall into the recess provided by the peripheral side wall. These rigid members include wall portions, ribs, and/or post members, some or all of which extend through openings provided for such purpose in the p.c. board, thereby assisting in the proper alignment of the board and rear casing during assembly. The rigid members are positioned to underlie the female contacts, some or all of which are mounted on the p.c. board, and some of which may be carried on contact strips within appropriately shaped compartments in the front casing. Thus, the rigid members on the rear casing provide underlying support for the contacts as the plug blades are inserted therein, as well as assisting in properly positioning the p.c. board within the rear casing.

Another unique aspect of the receptacle resides in the mounting strap and the manner of its interconnection to the housing formed by cooperative assembly of the front and rear casings. The mounting strap includes a rear portion extending across the outer, rear surface of the housing and positioned between a pair of parallel ribs extending from that surface. End portions of the strap extend integrally at 90° angles from the rear portion across the upper and lower surfaces of the housing formed by mating portions of the front and rear casing side walls. Protrusions on the upper and lower housing surfaces extend through slotted openings in the strap end portions, thereby preventing outward movement of the strap end portions away from the housing upper and lower surfaces. After the strap and housing are fully engaged, tabs on the end portions of the strap are bent over to engage portions of the front surface of the housing, thereby maintaining the strap and housing, as well as the front and rear casings in permanently assembled relation. Mounting ears, by which the receptacle is connected to a junction box, extend outwardly from each strap end portion.

The duplex receptacle is disclosed in two embodiments, one particularly directed to receiving plugs having parallel blades for insertion in the line and neutral contacts, and the other adapted to receive plugs having three blades arranged tangentially to a circle. The latter type of receptacle, used primarily in industrial applications, allows the plug to be releasably locked to the receptacle by turning the plug in a circular motion after insertion of the blades into the contacts. In one disclosed embodiment the line and neutral contact strips are mounted within recesses in the front casing, while in the other embodiment the contact strips are formed integrally with the line and neutral busses permanently mounted to the p.c. board.

DETAILED DESCRIPTION

Figure 1:
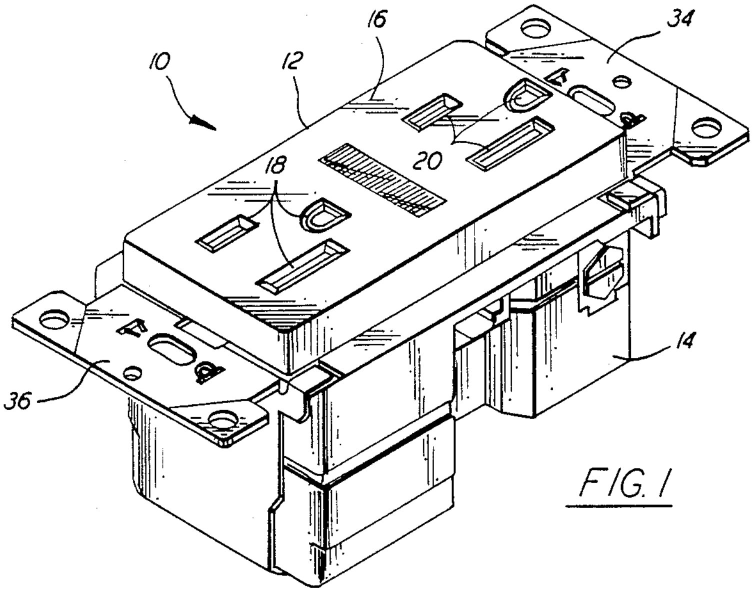
FIG. 1 is a perspective view of a fully assembled electrical receptacle representing a first preferred embodiment of the invention, seen from the upper side.
Figure 2:
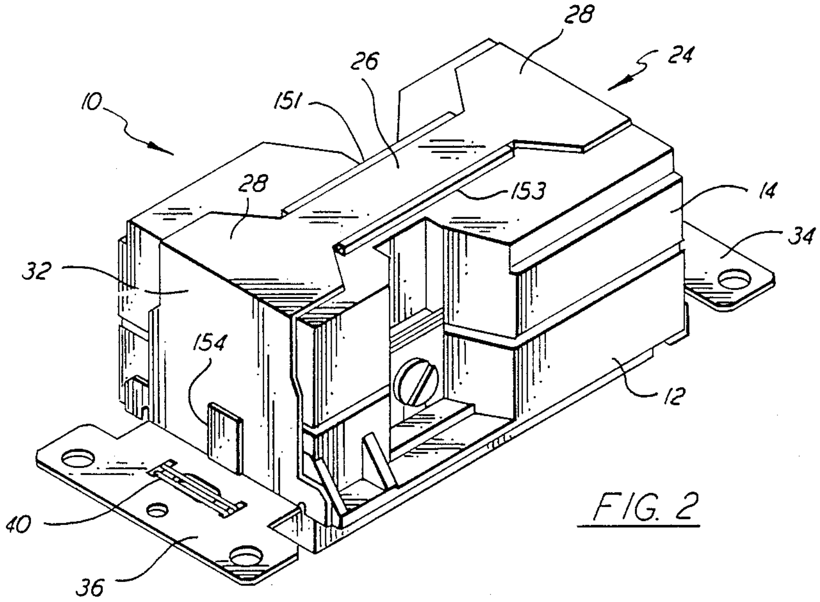
FIG. 2 is a perspective view of the assembled receptacle of FIG. 1, seen from the lower side.

Referring now to the drawings, the receptacle of the invention is shown a first embodiment and denoted generally by reference numeral 10 in FIGS. 1, 2, 10 and 11, in each of which the receptacle is in the fully assembled condition. Receptacle 10 includes front and rear casings 12 and 14, respectively, having cooperatively formed edge portions for mating engagement to provide an enclosed housing for the various components, as explained later. Front casing 12 includes front wall 16 having two sets of openings 18 and 20 extending therethrough to receive the prongs of a standard form of male plug in conventional fashion. One opening of each set is shaped and positioned to receive the plug grounded prong, and the other two openings are of different sizes to insure proper polarity when a plug having no grounding prong, but prongs of different widths for connection to the hot and neutral contacts of the receptacle, is inserted therein. Also mounted in an opening in front wall 16, between the two sets of openings 18 and 20, is lens 22 for purposes described later herein.

Figure 3:
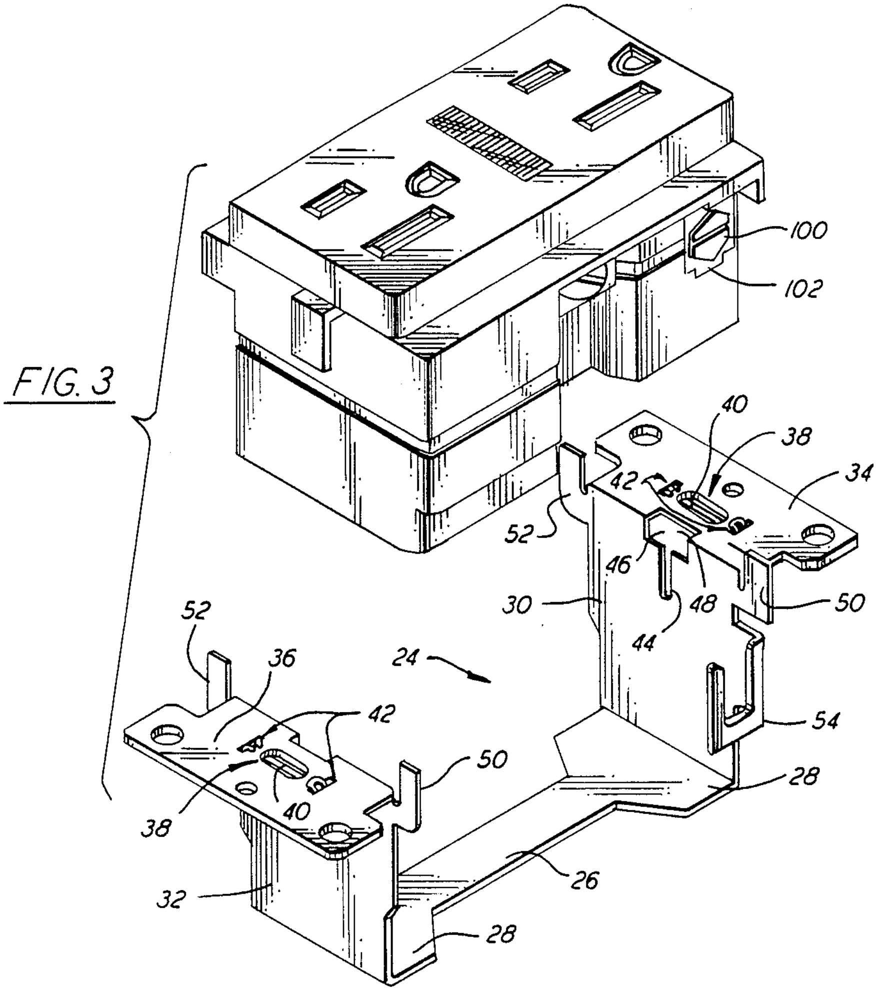
FIG. 3 is an exploded perspective view of the receptacle and of the mounting strap, shown prior to permanent assembly of the two.

In addition to the enclosed housing formed by front and rear casings 12 and 14, receptacle 10 includes mounting strap 24 positioned entirely exteriorly of the housing. As best seen in FIG. 3, mounting strap 24 is of essentially U-shaped configuration, having a medial section with upstanding legs at each end, and mounting ears extending outwardly from each leg. Strap 24 is of one-piece design, being formed from a suitably stamped and bent piece of sheet metal. The medial section of strap 24 includes central portion 26, having parallel side edges, and outer portions 28, tapering outwardly from both edges of central portion 26 to a greater width.

The legs or end portions of strap 24 are positioned above and below the receptacle housing in the usual orientation when installed for use; i.e., receptacle 10 is usually flush mounted with a wall surface with one set of openings 18 and 20 above the other. Accordingly, such portions of strap 24 will be referred to for convenience as upper and lower end portions 30 and 32, respectively, extending integrally from and perpendicular to outer medial portions 28. Likewise, upper and lower mounting ears 34 and 36 extend integrally outwardly and perpendicular to upper and lower end portions 30 and 32, respectively. Each of ears 34 and 36 includes a laterally elongated opening 38 through which the mounting screws (not shown) pass to connect receoptacle 10 to a conventional junction box suitably supported within a wall or at some other desired location. Wire clips 40, of the type disclosed more fully in U.S. Pat. No. 4,745,523, may be and preferably are secured at opposite ends in openings 42 on each side of openings 38 to provide a pair of wires between which the mounting screws must pass. This insures good electrical contact, providing a low resistance path to ground potential, between the mounting strap and junction box.

Also included in mounting strap 24 are means for permanent assembly thereof with the housing formed by front and rear casings 12 and 14. The assembly means on strap 24 include identical openings and a pair of tabs at both ends. The opening at the upper end is fully shown in FIG. 3 and includes a relatively narrow, elongated portion 44, communicating at its upper end with a wider portion, first and second parts 46 and 48, respectively, of which are in end portion 30 and mounting ear 34, respectively. A pair of tabs 50 and 52 extend upwardly on each side of both mounting ears 34 and 36 in the initially formed configuration of strap 24. These tabs are bent over to secure the strap to the housing in a manner explained later, and as shown in other drawing Figures. Slotted tab 54 extends outwardly from upper end portion 30 in the strap configuration shown in FIG. 3 for contact by the head of a screw providing a ground path between electrical contacts within the housing and strap 24, as explained later in more detail. In receptacles which are intended to have a so-called isolated ground, tab 54 is omitted from strap 24.

Figure 4:
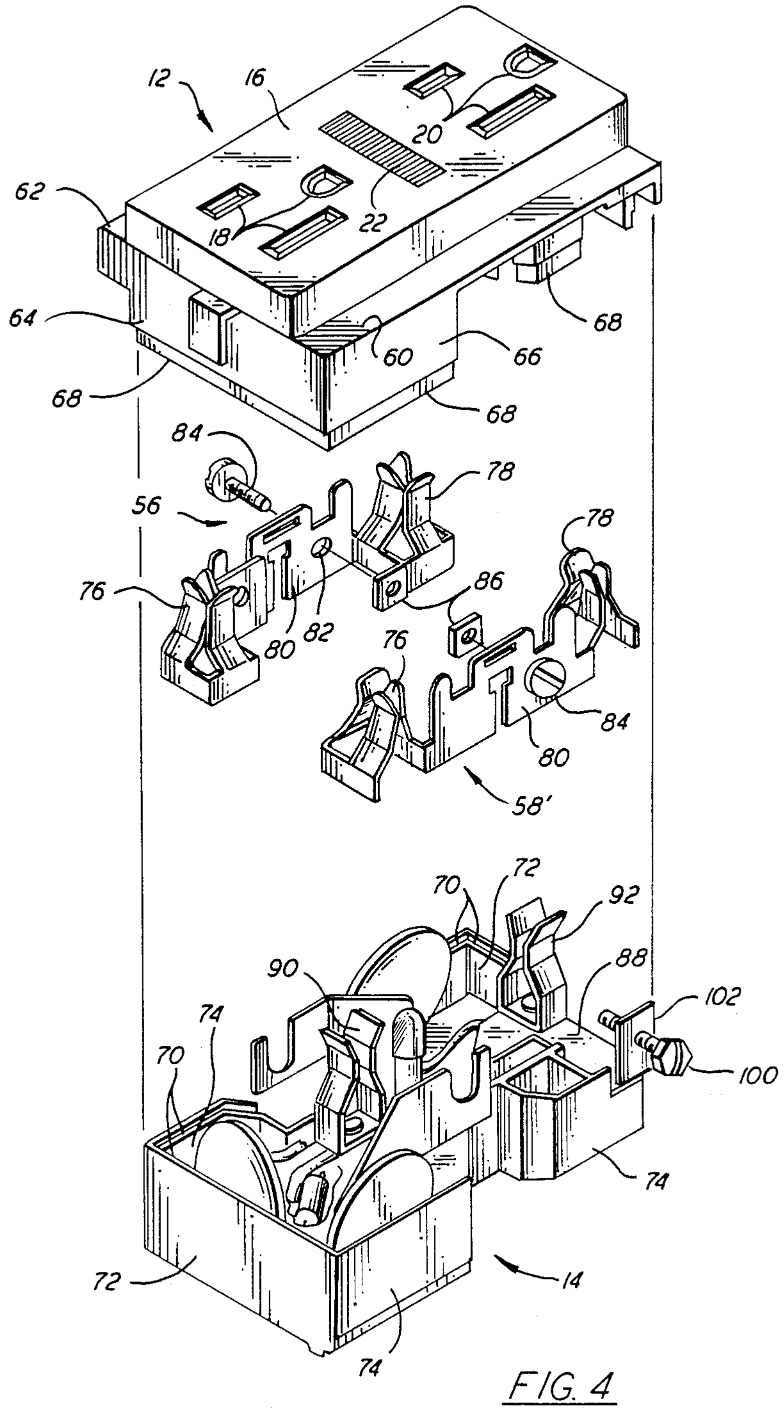
FIG. 4 is an exploded perspective view of the front and rear receptacle casings, showing the components mounted in the latter, and the contact strips.

Turning now to FIG. 4, upper and lower casings 12 and 14 are shown separated from one another with contact strips 56 and 58, which fit into appropriately shaped recesses in upper casing 12, therebetween. Shoulders 60 and 62 extend along each side of front wall 16 of front casing 12. Lower end wall 64 and side wall 66, as well as similar walls on the opposite end and side of upper casing 12, include peripherally extending flange portions 68 for cooperative fit inside mating flanges 70 on end and side walls 72 and 74, respectively, of rear casing 14. It will be noted that side walls 66 of upper casing 12 are not continuous, the discontinuities providing space for positioning the portions of contact strips 56 and 58 to which the incoming electrical wires are attached, as explained later.

Contact strips 56 and 58 are essentially identical, each being formed from a single piece of copper or other good electrical conductor, stamped, punched and bent to the desired configuration. Each includes at opposite ends a pair of prong-receiving elements or contacts 76 and 78 comprising three flexible strips which are spread apart to resiliently but firmly engage the prong of an electrical plug inserted therein. The strip of metal connecting contacts 76 and 78 on each of contact strips 56 and 58 includes a portion 80 having opening 82 therein for passage of screw 84 which is threaded into a corresponding nut 86. When contact strips 56 and 58 are placed within the recesses provided therefor in upper casing 12, portions 80 are positioned in the discontinuities in side walls 66, whereby the heads of screws 84 are accessible on the exterior of receptacle 10, as seen in other Figures, for attaching the line and neutral conductors of the electrical circuit in which receptacle 10 is included.

Components of an electrical circuit providing transient voltage surge suppression in receptacle 10 are mounted within rear casing 14 on a circuit board embedded in potting material 88. In addition to permanently fixing the circuit board and rear casing in predetermined relation, potting material 88 provides for isolation of components, preventing conduction between components due to high voltages. Also connected to the circuit board is a grounding contact strip having prong receiving elements or contacts 90 and 92, each comprising a pair of flexible strips which are spread apart by insertion therebetween of the ground prong of an electrical plug, riveted thereon.

Figure 5:
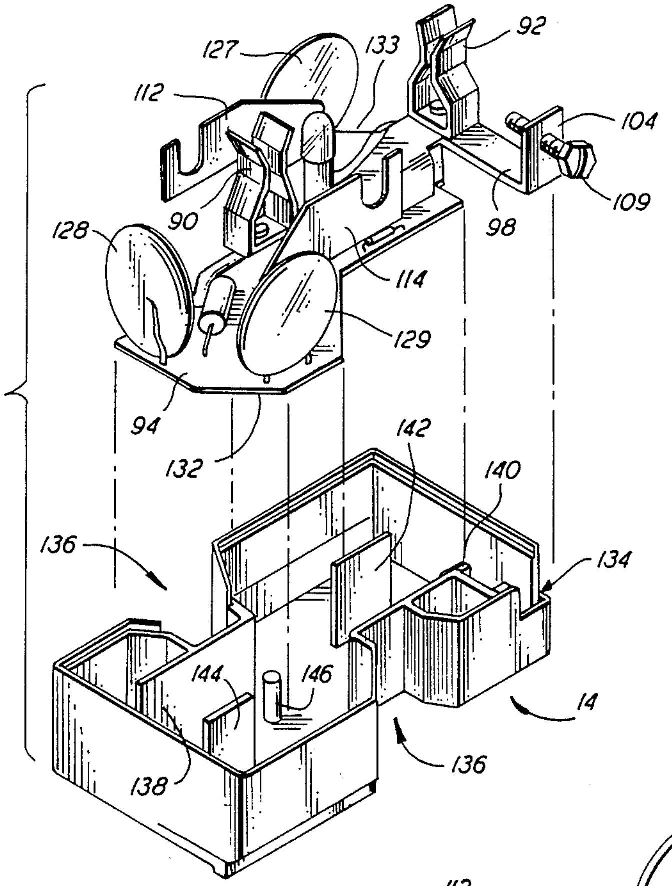
FIG. 5 is an exploded perspective view of the rear casing and the circuit board with components mounted thereon.
Figure 6:
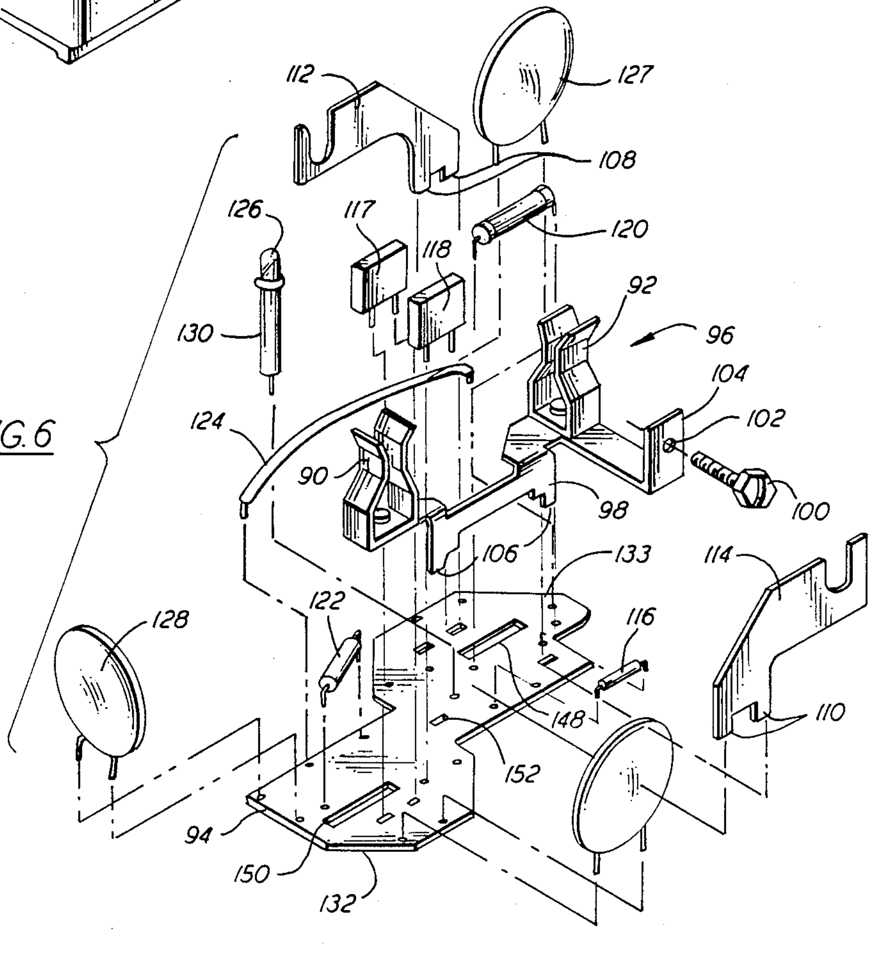
FIG. 6 is an exploded perspective view of the circuit board and components.

Circuit board 94 is shown in FIGS. 5 and 6, together with the elements mounted thereon, including ground buss assembly 96. This assembly includes contacts 90 and 92, strip 98 to which they are riveted or otherwise attached, and screw 100, received in threaded opening 102 in upturned tab 104 of strip 98. The previously described tab 54 on mounting strap 24 is engaged by the head of screw 100 to provide a ground connection from the junction box, through the mounting screws and strap 24 to ground buss assembly 96. In isolated ground receptacles, a separate, electrically grounded wire is connected to screw 100, and thus to the ground prong receiving structure of receptacle 10. Grounding strap 24 in such receptacles has no tab 54.

Integral tabs 106 on strip 98 of ground buss assembly 96 extend through openings in circuit board 94 and are soldered into connection with the printed circuit on the opposite side thereof. Tabs 108 and 110 on line and neutral terminal busses 112 and 114, respectively, also extend through openings in board 94 and are soldered to the circuit thereon. Other components having leads extending through circuit board 94 for inclusion in the circuit providing transient voltage protection to apparatus plugging into receptacle 10 are resistor 116, capacitors 117 and 118, fuse 120, diode 122, jumper wire 124, LED 126 and metal oxide varistor (MOV) devices 127, 128 and 129. In a desired construction, capacitors 117 and 118, each having a value of 0.0056 microfarads and rated for use across the line, provide noise suppression in the circuit.

The leads from LED 126 extend through plastic tube 130 which provides a desired positioning of LED 126, i.e., a standoff or spacing from board 94, directly behind previously mentioned lens 22. The connection of LED 126 in the circuit is such that the LED is illuminated as long as all MOVs are operative. If either of MOVs 127 or 128 is rendered inoperative by a high transient voltage applied thereto, fuse 120 blows and LED 126 is no longer illuminated. Fuse 120 may be rated at, e.g., 5 amps. This provides a visual indication of the need to replace receptacle 10 in order to restore transient voltage protection. The use of LEDs in this manner is conventional, as is the connection of the MOVs to provide clamping of the voltage to a safe level in all three modes, i.e., line-neutral, line-ground and neutral-ground.

After assembly of all components and busses on circuit board 94, including all necessary soldered connections, is complete, the board assembly is placed in rear casing 14 which is first filled to a desired level with a potting material in liquid form. It will be noted that the corners have been trimmed from the board 94 at 132 and 133; this permits the potting material to flow easily over the board as the latter is pushed downwardly into the liquid since the straight side edges of board 94 fit rather closely within the walls of rear casing 14.

Figure 8:
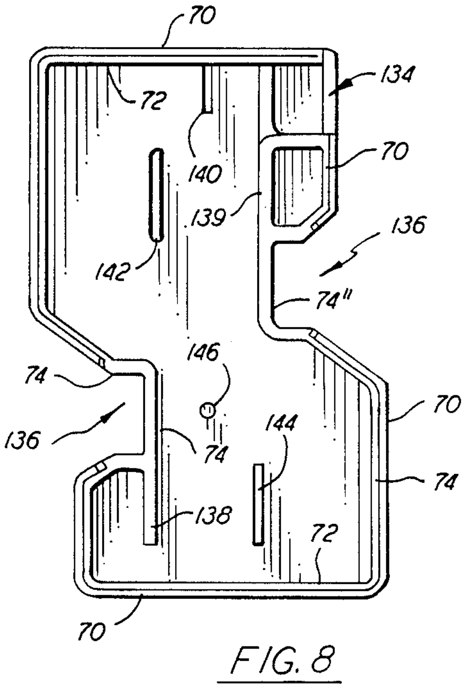
FIG. 8 is a front elevational view of the rear casing.

The configuration of rear casing 14, particularly its internal configuration, may be best seen with reference to FIGS. 5 and 8. End and side walls 72 and 74 extend continuously about the periphery of rear casing 14 and are of uniform height, except in area 134 where a portion is removed to expose screw 100 and tab 104 of ground buss 96. While end walls 72 are essentially planar and parallel to one another, side walls 74 are of irregular configuration in plan view, each having an inset portion 136 to conform to the side wall configuration of front casing 12. Wall portions 138 and 139 extend linearly from portions 74' and 74'', respectively, of side walls 74, and are of substantially the same height as the side and end walls. Wall portion 140 extends perpendicularly from one of end walls 72 into the interior of rear casing 14, and is about one-half the height of the side and end walls. Elongated tabs or ribs 142 and 144 extend integrally from the inner surface of the rear wall of rear casing 14, perpendicular to end walls 72 and of substantially the same height as the side and end walls. Post member 146 also extends integrally from the inner surface into the interior of the rear casing, having a height substantially equal to that of wall 140, i.e., about one-half that of ribs 142 and 144.

Elongated openings 148 and 150 and square opening 152 are cut through circuit board 94. Ribs 142 and 144 extend through openings 148 and 150, respectively, and post 146 through opening 152 when circuit board 94 is placed within rear casing 14. In addition to conformity of major portions of the peripheral outline of circuit board 94 to internal, vertical wall surfaces of rear casing 14, proper positioning of the board within the casing is provided by ribs 142 and 144 and post 146 extending through the openings in the board. However, the ribs and post are cooperatively positioned with other elements of the receptacle to perform additional functions, as will be explained later.

Figure 7:
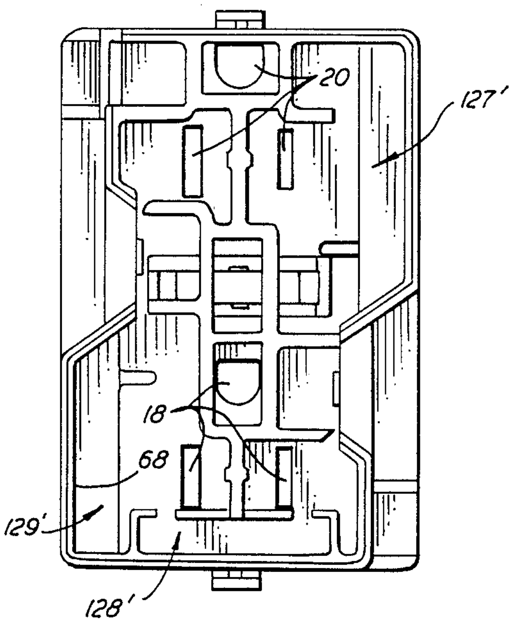
FIG. 7 is a rear elevational view of the front casing.
Figure 7A:
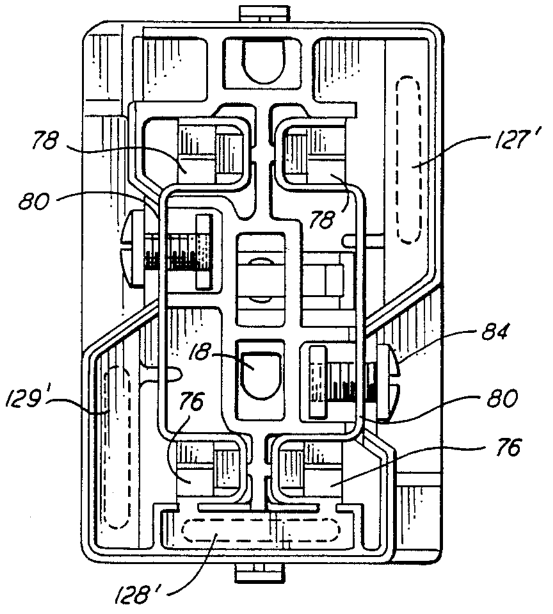
FIG. 7A is a rear elevational view of the front casing with the contact strips mounted therein.
Figure 8A:
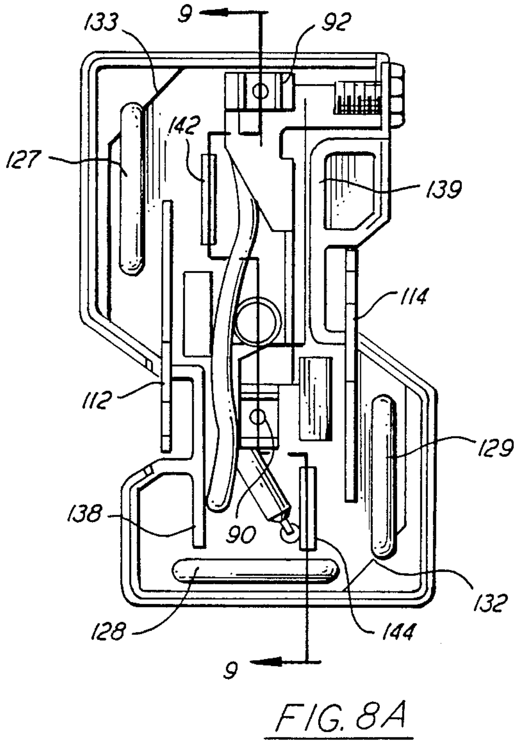
FIG. 8A is a front elevational view of the rear casing with components mounted therein.

Referring now to FIGS. 7 and 7A, the lower or inner side of front casing 12 is seen to include wall portions within the recess formed by end and side walls 64 and 66, respectively, to provide appropriate spaces for various elements positioned therein. The two sets of plug-receiving openings 18 and 20 are seen in FIG. 7, with two openings of each set being covered by contacts 76 and 78 in FIG. 7A. Portions 80 of contact strips 56 and 58 are seen to be positioned in the discontinuities in side walls 66. When the front and rear casing assemblies, as shown in FIGS. 7A and 8A, respectively, are placed in assembled relation, ground contact elements 90 and 92 extend into the recesses provided by wall portions surrounding the ground prong receiving openings of sets 18 and 20. The positions of the MOVs within front casing 12 are indicated in phantom lines in FIG 7A, and denoted by reference numerals 127′, 128′ and 129′.

Figure 9:
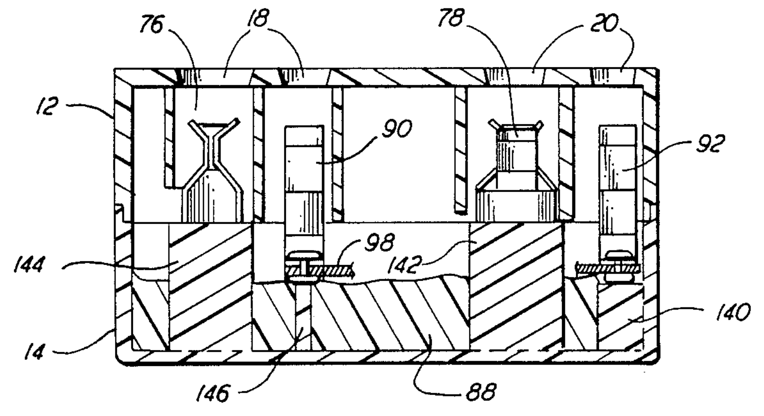
FIG. 9 is a side elevational view in section on the line 9—9 of FIG. 8A, also showing portions of the front casing.

Rear casing 14 is designed to provide underlying support for the plug-receiving contacts to insure that the plug blades may be securely inserted therein. This may be best seen with reference to FIG. 9, wherein several of the contact support elements of the rear casing are shown in cross section. The irregular section line of FIG. 8A passes through rib 144 which is seen in FIG. 9 to be positioned directly under contact 76 of contact strip 58 when the receptacle is fully assembled. Likewise, rib 142 is positioned to provide underlying support for contact 78 of contact strip 56; post 146 and wall portion 140 are positioned under and provide support for ground contacts 90 and 92, respectively. Although not shown in FIG. 9, it will be apparent from the relative arrangement of parts that wall portions 138 and 139 provide support for contact 76 of strip 56 and contact 78 of strip 58, respectively.

After all internal assembly operations are complete and front and rear casings 12 and 14 have been placed in cooperative relation, as in FIG. 3, assembly of receptacle 10 is completed by joining mounting strap 24 with the housing formed by the casings. The mounting strap and housing are moved into assembled relation by sliding upper and lower end portions 30 and 32, respectively, of strap 24 across the upper and lower walls of the housing, formed by end walls 64 and 72 of upper and lower casings 12 and 14, respectively. As the strap and housing become fully engaged, the shank of screw 100 is positioned in the slot in tab 54, i.e., tab 54 is positioned between the head of screw 100 and tab 102, in receptacles wherein the mounting strap includes a tab 54. Central portion 26 of the medial section of strap 24 lies between elongated ribs 151 and 153 (FIG. 2) on the rear surface of rear casing 14. Also, a protrusion of each end wall 64 of front casing 12 engages the strap by means of the previously described openings therein.

Figure 10:
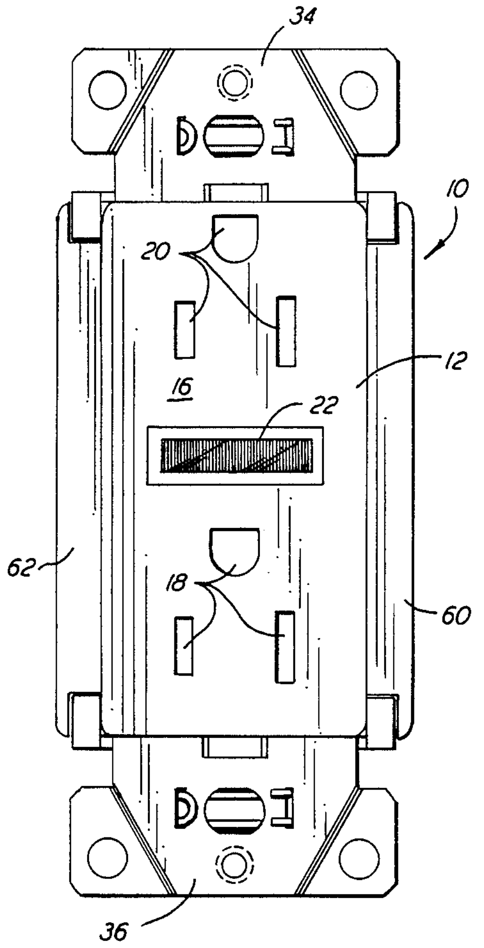
FIGS. 10 and 11 are front and rear elevational views, respectively, of the fully assembled receptacle of all previous views.
Figure 11:
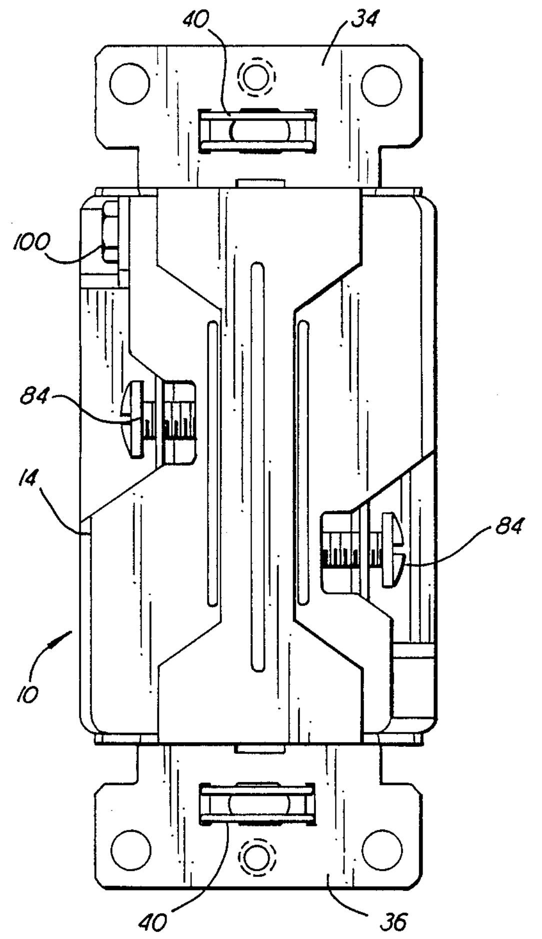

The protrusions, which are integrally formed as part of end walls 64 of front casing 12, include wall portion 154, parallel to and spaced from casing end wall 64, and connected thereto by web portion 156 and top wall portion 158. It will be readily seen that as the receptacle housing and mounting strap are moved together until the medial portion of the strap contacts the rear surface of rear casing 14, web portion 156 will extend through narrow portion 44 of the strap opening and top wall portion 158 will be positioned in wider portions 46 and 48. Thus, portions of strap 24 on each side of narrow portions 44 of the strap openings will be positioned between top casing end walls 64 and wall portions 154 of the protrusions. This prevents outward movement of strap end portions 30 and 32 with respect to the receptacle housing. After the strap and housing are so assembled, tabs 50 and 52 of strap 24 are bent over to engage shoulders 60 and 62 of front casing 12, as shown in FIGS. 1 and 10, thus preventing disassembly of the strap and housing.

Figure 13:
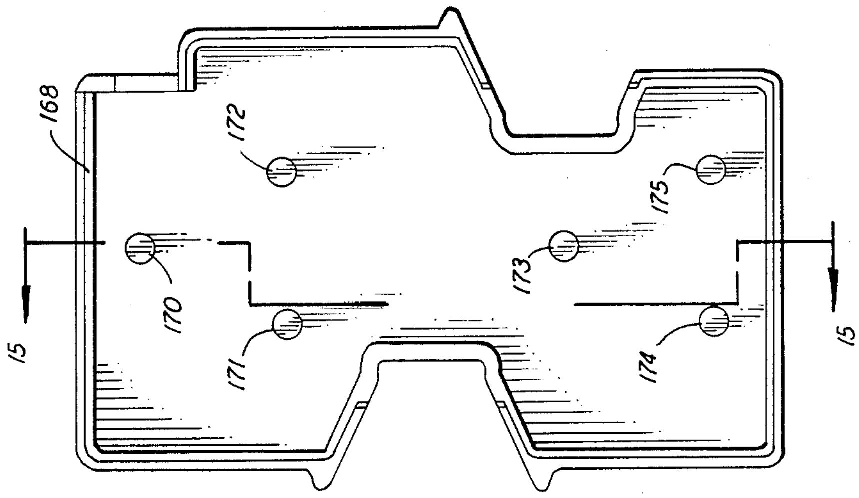
FIG. 13 is a front elevational view of the rear casing of the receptacle of FIG. 12.
Figure 12:
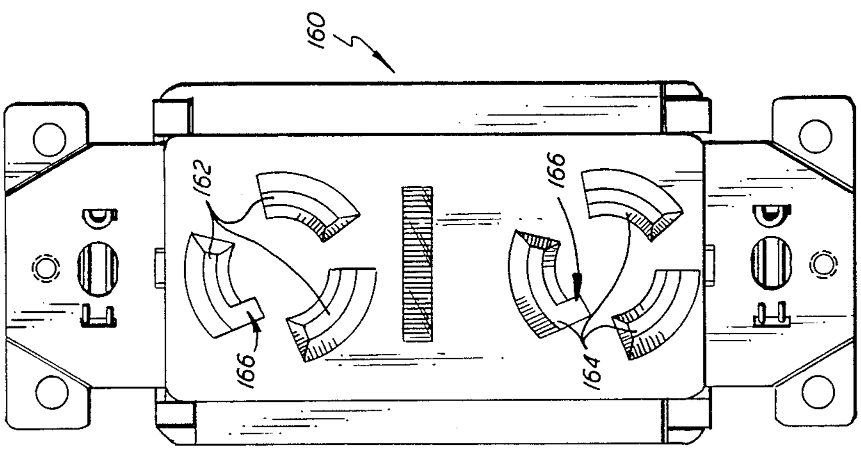
FIG. 12 is a front elevational view of a second embodiment of the receptacle of the invention.
Figure 14:
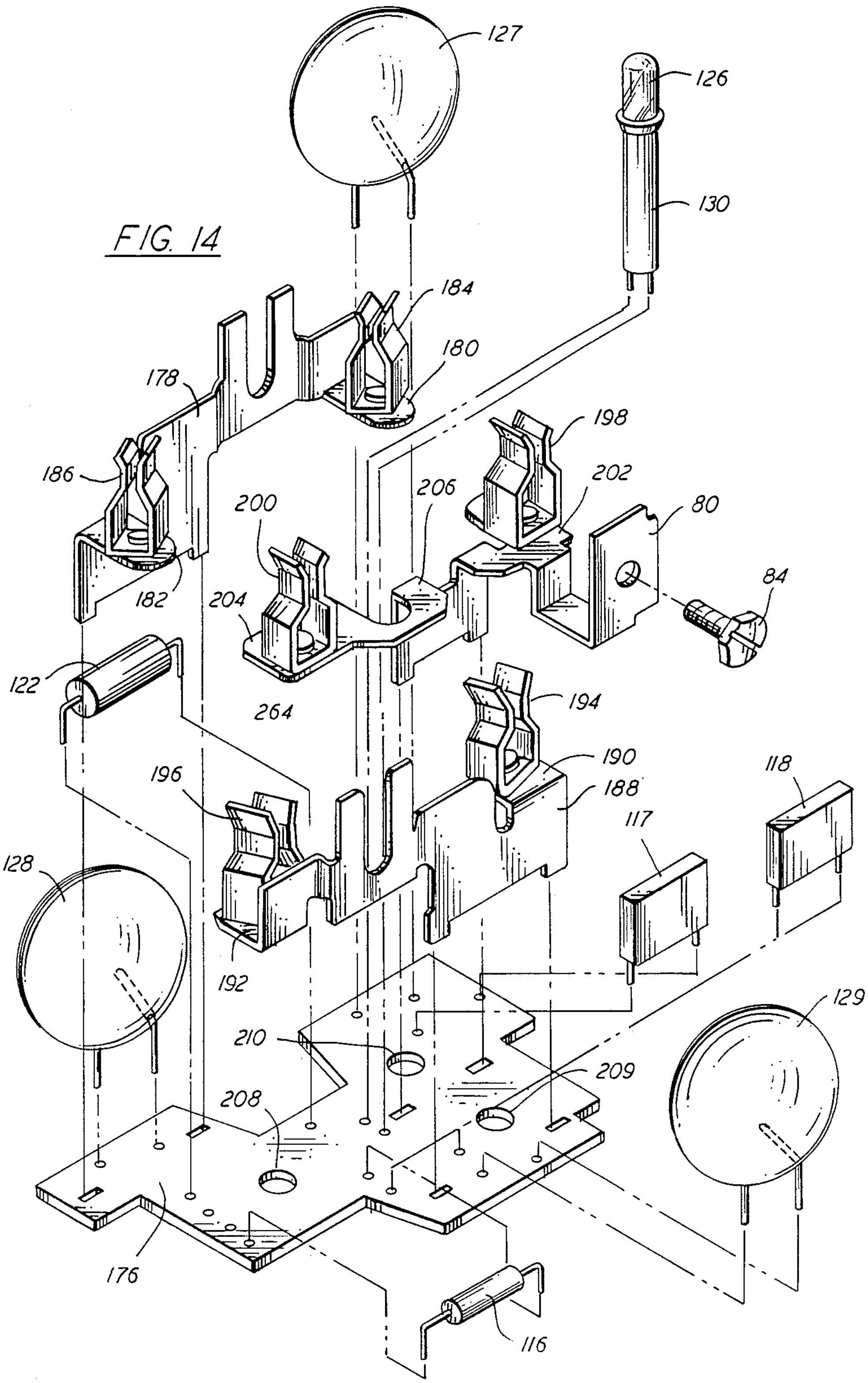
FIG. 14 is an exploded perspective view of the circuit board and components of the receptacle of FIG. 13.

Turning now to FIGS. 12–14, another embodiment of duplex receptacle, indicated generally by reference numeral 160, will be briefly described in order to illustrate the versatility of the invention. Configuration of the mounting strap and receptacle housing are the same as that just described in connection with the first embodiment, and will therefore not be repeated. The outer configuration of the front and rear casings may also be identical to those of the previous embodiment.

The two sets of three openings in the front wall of receptacle 160, denoted by reference numerals 162 and 164, are arranged in a circular pattern, one opening of each set including a wider, cut-out portion 166. Such plug-receiving openings are provided in a type of receptacle for use with plugs having three blades arranged in the same circular configuration, one of which has a portion for insertion through cut-out portion 166 of one of the openings. The plug is rotated after insertion of position the portion of the blade inserted through cut-out portion 166 under the front wall of the receptacle, whereby the plug cannot be removed until it is counter-rotated to its original position. The blade-receiving contacts within the receptacle, of course, are arranged in a circular configuration corresponding to that of openings 162 and 164.

Rear casing 168 of receptacle 160, shown in FIG. 13, includes end and side walls about the entire periphery thereof, as in the first embodiment. Post members 170, 171 and 172 extend integrally from the inner surface of the rear wall of rear casing 168, and are each positioned under one of openings 162 in the assembled condition of the receptacle. Post members 173, 174 and 175 are likewise positioned under openings 164.

Circuit board 176 of receptacle 160 and the components mounted thereon are shown in FIG. 14. All components and the circuit on the lower side of board 176 are the same as in the receptacle 10, except that this embodiment does not include a jumper wire and, of course the circuit board layout may differ. Circuit board 176 is of somewhat different configuration from board 98, and all terminal busses are integral with the contact strips. Line terminal buss assembly 178 includes portions 180 and 182 to which blade-receiving contacts 184 and 186, respectively, are riveted. Neutral terminal buss assembly 188 includes portions 190 and 192 to which contacts 198 and 200 are riveted. Ground blade receiving contacts 198 and 200 are riveted to portions 202 and 204 of ground buss assembly 206. Each buss includes tabs extending through circuit board 176 and soldered to terminals in the circuit on the opposite side thereof.

Figure 15:
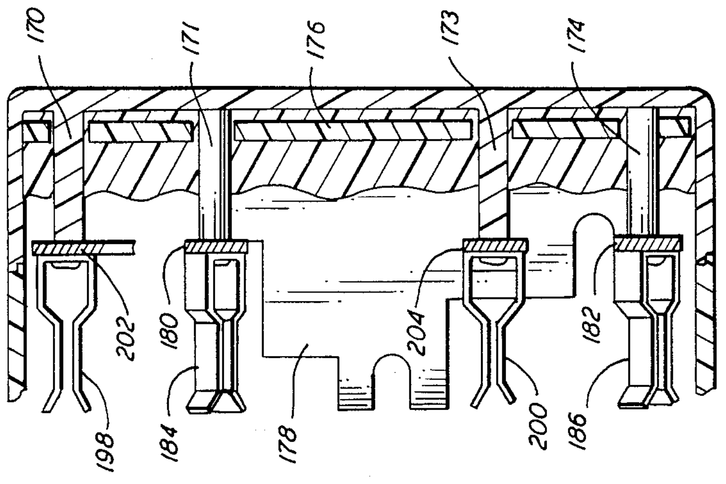
FIG. 15 ia a side elevational view in section on the line 15—15 of FIG. 13, showing portions of the components mounted within the rear casing.

When circuit board 176 is placed in rear casing 168, posts 170, 174 and 175 extend through openings 208, 209 and 210, respectively. As seen in FIG. 15, posts 170 and 173 are positioned directly under portions 202 and 204, and thus under contacts 198 and 200, respectively, of ground buss assembly 206, and posts 171 and 174 are positioned under contacts 184 and 186 of line buss assembly 178. Although not seen in FIG. 15, it will be understood that posts 172 and 175 are positioned under contacts 194 and 196 of neutral buss assembly 188.

From the foregoing, it may be seen that the invention provides a compact and high quality duplex receptacle having means for protecting equipment connected thereto against damage from high transient voltages on the AC circuit in which the receptacle is connected. The particular level of clamping voltage is, of course, optional, but is high enough to aboid actuation at unnecessarily low voltages. For example, in circuits having a nominal 110–115 v line current, a clamping voltage of 150 v is preferred. The plug blade receiving contacts are positioned directly over and supported by integral post and/or wall portions of the rear casing forming a portion of the receptacle housing. Such posts and wall portions may also extend through openings in, and assist in positioning within the rear casing, the printed circuit board which carries the components and circuit connections for the transient voltage protection circuit. The receptacle includes a mounting strap which is entirely external of the housing and secured thereto without screws, rivets or other supplemental connecting means.

What is claimed is:

1. An electrical receptacle having integral means for suppressing high transient voltages in the power provided by the receptacle to electrical equipment connected thereto, said receptacle comprising:

(a) a rear casing having:

(i) a back wall with substantially flat inner and outer surfaces;

(ii) a side wall extending integrally from said back wall about the entire periphery thereof and perpendicular thereto, said side wall having inner and outer surfaces adjoining the respective inner and outer surfaces of said back wall; and (iii) at least one rigid member extending outwardly from said back wall inner surface within the periphery of said wall;

(b) a substantially flat printed circuit board carrying:

(i) a plurality of components including at least one element adapted to clamp high, short-term voltages imposed thereon to a lower, safe level;

(ii) at least one female contact for receiving a male blade of a plug connected to said receptacle; and (iii) means electrically connecting said components and said contact;

(iv) said circuit board having a peripheral configuration fitting within said side wall inner surface with said circuit board in a plane superposed and substantially parallel with said back wall inner surface;

(c) cooperative alignment means on said circuit board and said rear casing for positioning said circuit board, and thereby said components and contact carried thereby, in predetermined relation to said rear casing, said contact being positioned directly over and receiving underlying support from said rigid member when said circuit board and said rear casing are in said predetermined relation; and (d) a front casing having:

(i) a front wall having openings for receiving the male blades of a plug connected to said receptacle; and (ii) means for cooperatively engaging said rear casing to form therewith an enclosed housing containing said circuit board and elements carried thereby.

2. The receptacle of claim 1 wherein said circuit board includes at least one opening therethrough and said rigid member extends through said opening when said circuit board and said rear casing are in said predetermined relation.

3. The receptacle of claim 1 wherein said circuit board carries two, first and second female contacts and at least two, first and second rigid members extend from said rear casing inner surface, said first and second contacts being positioned directly over and receiving underlying support from said first and second rigid members, respectively.

4. The receptacle of claim 3 wherein said receptacle is a duplex receptacle, said front casing front wall has two, first and second sets of said openings for separately receiving plugs connected to said receptacle, and said first and second female contacts are positioned to receive male blades of plugs inserted in said first and second sets of openings, respectively.

5. The receptacle of claim 4 and further including at least two additional, third and fourth female contacts positioned to receive male blades of plugs inserted in said first and second sets of openings, respectively, and two additional, third and fourth rigid members extending from said rear casing inner surface, said third and fourth contacts being positioned directly over and receiving underlying support from said third and fourth rigid members, respectively.

6. The receptacle of claim 5 and further including wall means extending from said front casing inner surface and defining cooperative positioning means for said third and fourth contacts.

7. The receptacle of claim 6 wherein said front casing further includes a side wall extending integrally from said front wall, and portion of said front casing side wall provide said means for cooperatively engaging said rear casing.

8. The receptacle of claim 7 wherein said circuit board includes at least two openings therethrough and at least two of said rigid members extend through respective ones of said circuit board openings.

9. The receptacle of claim 7 wherein at least one of said rigid members extends integrally from said inner surfaces of both said rear casing back wall and side wall.

10. The receptacle of claim 7 and further including a potting material within said rear casing substantially fully encapsulating said circuit board, thereby permanently fixing said circuit board and said rear casing in said predetermined relation.

11. An electrical receptacle for flush wall mounting in a recessed junction box, said receptacle comprising:

(a) a rear casing member having back and side walls;

(b) a front casing member having front and side walls, said front casing front wall having a plurality of openings therethrough for receiving the blades of an electrical plug connected to said receptacle;

(c) means for attaching said front and rear casing members to one another to form an enclosed housing having forwardly, rearwardly, upwardly and downwardly facing surfaces;

(d) a one-piece mounting strap positioned entirely exteriorly of said housing and including:

(i) a rear portion in contact with and extending across said rearwardly facing surface;

(ii) upper and lower end portions extending integrally from opposite ends of said rear portion in contact with said upwardly and downwardly facing surfaces, respectively;

(iii) upper and lower mounting ears extending integrally outwardly from said upper and lower end portions, respectively;

(e) first retaining means extending integrally from each of said end portions in contact with said forwardly facing surface; and (f) second retaining means including first portions on each of said end portions and second portions, cooperatively engaged with said first portions, on the exterior of said housing.

12. The receptacle of claim 11 and further including a pair of spaced, parallel ribs extending from said rearwardly facing surface, said mounting strap rear portion having parallel side edges lying closely between said ribs, whereby said ribs provide a positioning guide for said strap.

13. The receptacle of claim 11 wherein said first retaining means comprises at least one tab integrally attached to each of said upper and lower end portions and extending at substantially right angles thereto over said forwardly facing surface, whereby said housing means is engaged between said strap rear portion and said tabs.

14. The receptacle of claim 13 wherein said first retaining means comprises four tabs, one extending from each side of both said upper and lower end portions at substantially right angles thereto, whereby said housing means is engaged between said strap rear portion and said tabs.

15. The receptacle of claim 11 wherein said first portions of said second retaining means comprise a slotted opening in each of said strap end portions.

16. The receptacle of claim 15 wherein said second portions of said second retaining means comprise an integrally formed protrusion on each of said upwardly and downwardly facing housing surfaces.

17. The receptacle of claim 16 wherein said protrusions each include a reduced width portion integrally joined to said housing surfaces and an extended width portion integrally joined to said reduced width portion, said slotted opening being wider and narrower than said reduced and extended width portions, respectively, whereby said strap end portions may be slidingly moved across said upwardly and downwardly facing surfaces to engage said reduced width portions in said slotted openings with parts of said end portions lying between said upwardly and downwardly facing surfaces and said extended width portions to prevent movement of said strap end portions outwardly away from said upwardly and downwardly facing surfaces.

18. The receptacle of claim 17 wherein said first retaining means comprises four tabs, one extending from each side of both said upper and lower end portions at substantially right angles thereto, whereby said housing means is engaged between said strap rear portion and said tabs.

19. The receptacle of claim 11 and further including a ground buss having an enclosed portion on the interior of said housing in electrical communication with at least one contact for receiving the grounding blade of a plug connected to said receptacle and an exposed portion accessible on the exterior of said housing, and said strap includes an arm extending integrally from one of said end portions in electrical contact with said ground buss exposed portion.

20. The receptacle of claim 19 and further including a screw engaged in a threaded opening in said ground buss exposed portion, said arm being held in tight engagement with said ground buss exposed portion by said screw.

21. The receptacle of claim 20 wherein said arm includes an open slot extending inwardly from an edge of said arm, said screw extending through said slot with the portions of said arm adjacent said slot engaged between a head on said screw and said ground buss exposed portion.

22. An electrical receptacle for connection to line and neutral wires of an electrical circuit and to electrical grounding means, said receptacle having integral means for suppressing high transient voltages across any of said line and neutral, line and ground, and neutral and ground connections, said receptacle comprising:

(a) a rear casing having a back wall and a peripheral side wall extending integrally from said back wall and defining the boundary of a recess in said rear casing;

(b) a front casing having a front wall having at least one set of three openings and means for cooperative assembly with said rear casing to form an enclosed housing;

(c) a printed circuit board carrying electrical components including at least one set of three female contacts for receiving the male blades of a plug inserted through said front wall openings, and three varistor devices each adapted to clamp high, short-term voltages imposed thereon to a lower, safe level;

(d) first and second terminal busses and a ground buss each having an enclosed portion on the interior of said housing and an exposed portion on the exterior of said housing for respective attachment of said line and neutral wires and said grounding means;

(e) circuit means connecting said contacts, said varistor devices and said busses with one of said contacts connected to a respective one of said busses, and one of said varistor devices connected between each two of said busses;

(f) support means for holding said circuit board in a predetermined position within said recess, with said varistor devices extending toward said front casing from spaced positions on said circuit board; and (g) wall means extending from said front wall into the interior of said housing and forming three spaced cavities positioned to receive the respective varistor devices.

23. The receptacle of claim 22 and further including a mounting strap positioned entirely exteriorly of said housing.

24. The receptacle of claim 23 wherein said strap is electrically connected to said ground buss.

* * * * *